United States Patent
Antweiler et al.

(10) Patent No.: US 12,351,457 B2
(45) Date of Patent: Jul. 8, 2025

(54) METHOD AND DEVICE FOR PRODUCING HYDROGEN AND PYROLYTIC CARBON FROM HYDROCARBONS

(71) Applicants: thyssenkrupp Industrial Solutions AG, Essen (DE); thyssenkrupp AG, Essen (DE)

(72) Inventors: Nicolai Antweiler, Essen (DE); Karsten Bueker, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 627 days.

(21) Appl. No.: 17/776,824

(22) PCT Filed: Nov. 12, 2020

(86) PCT No.: PCT/EP2020/081928
§ 371 (c)(1),
(2) Date: May 13, 2022

(87) PCT Pub. No.: WO2021/094464
PCT Pub. Date: May 20, 2021

(65) Prior Publication Data
US 2023/0025624 A1  Jan. 26, 2023

(30) Foreign Application Priority Data
Nov. 13, 2019 (DE) .................. 10 2019 130 600.0

(51) Int. Cl.
*C09C 1/48* (2006.01)
*B01J 6/00* (2006.01)
(Continued)

(52) U.S. Cl.
CPC ................. *C01B 3/28* (2013.01); *B01J 6/008* (2013.01); *B01J 8/0242* (2013.01); *C09C 1/48* (2013.01);
(Continued)

(58) Field of Classification Search
CPC .......... B01J 8/0242; C09C 1/48; C09C 1/485
See application file for complete search history.

(56) References Cited

U.S. PATENT DOCUMENTS 2,926,073 A   2/1960   Robinson et al.
3,284,161 A   11/1966  Pohlenz et al.
(Continued)

FOREIGN PATENT DOCUMENTS

CN    1774291 A       5/2006
DE    10 2015 218 098 A1   3/2017
(Continued)

OTHER PUBLICATIONS

Dunker, et al.,"Kinetic modeling of hydrogen production by thermal decomposition of methane", Int. J. Hydrogen Energy, 31:1989-1998 (2006).
(Continued)

*Primary Examiner* — Stuart L Hendrickson
(74) *Attorney, Agent, or Firm* — thyssenkrupp North America, LLC

(57) ABSTRACT

A process for producing hydrogen and pyrolytic carbon from hydrocarbons may involve converting hydrocarbons into hydrogen and carbon in a reactor at temperatures of 1000° C. or more. The reactor may include two electrodes spaced apart from one another in a flow direction of the hydrocarbons. In a region of the reactor between the electrodes an inert gas component is supplied over an entire reactor cross section. The reactor contains carbon particles in the region between the two electrodes. By introducing an inert gas component over the entire reactor cross section, deposition of carbon in this region of the reactor inner wall is prevented, thus effectively inhibiting the formation of conductivity bridges on the reactor inner wall.

19 Claims, 2 Drawing Sheets

(51) Int. Cl.
- *B01J 8/02* (2006.01)
- *C01B 3/28* (2006.01)
- *C09C 1/50* (2006.01)

(52) U.S. Cl.
CPC ............... *C09C 1/485* (2013.01); *C09C 1/50* (2013.01); *C01B 2203/0272* (2013.01); *C01B 2203/085* (2013.01); *C01B 2203/1241* (2013.01); *C01B 2203/169* (2013.01)

(56) References Cited

U.S. PATENT DOCUMENTS

| | | | |
|---|---|---|---|
| 3,344,051 A * | 9/1967 | Latham, Jr. | ............... C09C 1/50 422/906 |
| 4,044,117 A | 8/1977 | Matovich | |
| 4,671,944 A | 6/1987 | Schramm | |
| 5,650,132 A | 7/1997 | Murata et al. | |
| 9,359,200 B2 | 6/2016 | Maass et al. | |
| 2004/0253168 A1 | 12/2004 | Chu | |
| 2007/0111051 A1 | 5/2007 | Muradov | |
| 2009/0060805 A1 | 3/2009 | Muradov et al. | |

FOREIGN PATENT DOCUMENTS

| | | |
|---|---|---|
| DE | 10 2015 219 861 A1 | 4/2017 |
| JP | H0290939 A | 3/1990 |
| RU | 80160 U1 | 1/2009 |
| RU | 2414418 C2 | 1/2010 |
| RU | 2425795 A | 3/2011 |
| RU | 2608398 A | 8/2015 |
| RU | 166224 U1 | 11/2016 |
| WO | 2004/091773 A1 | 10/2004 |
| WO | 2014208503 A1 | 12/2014 |

OTHER PUBLICATIONS

Dunker, et al., "Production of hydrogen by thermal decomposition of methane in a fluidized-bed reactor—Effects of catalyst, temperature, and residence time", Int. J. Hydrogen Energy, 31:473-484 (2006).

Bai, et al., "Catalytic decomposition of methane over activated carbon", J. Anal. Appl. Pyrolysis, 73:335-341 (2005).

Moliner, et al., "Thermocatalytic decomposition of methane over activated carbons: influence of textural properties and surface chemistry", International Journal of Hydrogen Energy, 30:293-300 (2005).

Hox, et al., "Plasmabased Hydrogen and Energy Production", Hydrogen Power: Theoretical and Engineering Solutions, pp. 143-148 (1998).

Muradov, et al., Autothermal catalytic pyrolysis of methane as a new route to hydrogen production with reduced CO2 emissions, Catalysis Today, 116:281-288 (2006).

Kreysa, et al., "Decarbonisation of Fossil Energy via Methane Pyrolysis", The Future Role of Hydrogen in Petrochemistry and Energy Supply, DGMK Conference Oct. 4-6, 2010, Berlin, Germany, pp. 31-38 (2010).

Lynum, Steinar, "Hydrogen from natural gas without release of CO2 to the atmosphere", Bjorn Gaudernack Institute for Energy Technology, pp. 511-523 (1996).

Steinberg,M., "Fossil fuel decarbonization technology for mitigating-global warming", Int. J. Hydrogen Energy, 24:771-777 (1999).

Shpilrain, E.E., et al., "Comparative analysis of different natural gas pyrolysis methods", Int. J. Hydrogen Energy, 24:613-624 (1999).

English Translation of International Search Report issued in PCT/EP2020/081928, dated Feb. 9, 2021.

Agar, bschlussbericht Förderprojekt "Methanpyrolyse zur Wasserstofferzeugung ohne CO2-Emissionen" ("Final report on the funded project Methane pyrolysis for hydrogen production without CO2 emissions"), Feb. 11, 2014.

Muradov, "Thermocatalytic CO2-Free Production Of Hydrogen From Hydrocarbon Fuels", U.S. Department of Energy, 105 pages, 2003.

Rodat, et al., "A pilot-scale solar reactor for the production of hydrogen and carbon black from methane splitting", International Journal of Hydrogen Energy, 35:7748-7758, Apr. 2018.

Steinberg et al., Rates of Reaction and Process Design Data for the Hydrocarb Process, EPA, 4 pages, Apr. 1993.

Kreysa, "Climate Protection by an Alternative Use of Methane—The Carbon Moratorium", Chem. Sus. Chem., 2:49-55, 2009.

Maag, et al., "Solar thermal cracking of methane in a particle-flow reactor for the co-production of hydrogen and carbon", International Journal of Hydrogen Energy, 34: 7676-7685, 2009.

Kreysa,G., "Climate Protection by an Alternative Use of Methane—TheCarbon Moratorium**", Chem. Sus. Chem., 2: 49-55 (2009).

Gaudernack et al., "Hydrogen From Natural Gas Without Release of CO1 to the Atmosphere", Int. J. Hydrogen Energy, 23(12): 1087-1093 (1998).

Callahan, M., "Catalytic Pyrolysis of Methane and Other Hydrocarbons", Fuel Cell Sessions, pp. 181-184 (1974).

Sandstede, G., "Decompostion of Hydrocarbons into Hydrogen and Carbon for the CO2-free Production of Hydrogen", Battelle Institut, Germany, pp. 1745-1753 (1992).

\* cited by examiner

METHOD AND DEVICE FOR PRODUCING HYDROGEN AND PYROLYTIC CARBON FROM HYDROCARBONS

CROSS REFERENCE TO RELATED APPLICATIONS

This application is a U.S. National Stage Entry of International Patent Application Serial Number PCT/EP2020/081928, filed Nov. 12, 2020, which claims priority to German Patent Application No. DE 10 2019 130 600.0, filed Nov. 13, 2019, the entire contents of all of which are incorporated herein by reference.

FIELD

The present disclosure generally relates to pyrolytic decomposition of hydrocarbons, including the decomposition of methane into hydrogen and pyrolytic carbon.

BACKGROUND

In the near to medium term future, hydrogen production will continue to be based on fossil fuels, primarily natural gas (NG). On the other hand, conventional hydrogen production processes are one of the main sources of anthropogenic $CO_2$ emissions into the atmosphere.

Hydrogen is in principle obtainable from hydrocarbon fuels through oxidative and nonoxidative conversion processes. Oxidative conversions comprise the reaction of hydrocarbons with oxidizing agents, such as water, oxygen or combinations of water and oxygen (steam reforming, partial oxidation and autothermal reforming processes). These processes comprise as a first step forming a mixture of hydrogen and carbon monoxide (synthesis gas) from which the hydrogen is separated by gas conditioning (water gas shift reaction) and preferably oxidation reactions and $CO_2$ removal stages. The total $CO_2$ emissions from these processes reach up to 0.5-0.6 $m^3$ per $m^3$ of hydrogen produced.

Nonoxidative processes comprise thermal decomposition (or dissociation, pyrolysis, cracking) of hydrocarbons into hydrogen and carbon. The thermal decomposition of natural gas has been used for several decades as a means of producing carbon black, wherein hydrogen represents a product of value additionally obtained in the process. In these processes, hydrocarbon vapor is decomposed into hydrogen and carbon black particles over a preheated contact at a temperature of about 1400° C. The process has been performed for example as a semi-continuous (cyclic) process using two tandem reactors. U.S. Pat. No. 2,926,073 describes an improved apparatus for producing carbon black and hydrogen from hydrocarbons by a continuous thermal decomposition process. The Kvaerner Company of Norway has developed a methane decomposition process that produces hydrogen and carbon black at high temperatures (CB&H process, disclosed in Proc. 12th World Hydrogen Energy Conference, Buenos Aires 697, 1998). The advantages of the plasma-chemical processes used in this process are high thermal efficiency (>90%) and the purity of the hydrogen (98% by volume). However, the high energy consumption is a disadvantage. Steinberg et al. have in Int. J. Hydrogen Energy, 24, 771, 1999 proposed a methane decomposition reactor which consists of a molten metal bath. In this reactor, methane bubbles are passed through a molten tin or copper bath at high temperatures (900° C. and more). The advantages of this system are efficient heat transfer to the methane gas stream and easy separability of the carbon from the liquid metal surface due to the density difference.

A high temperature regenerative gas heater for hydrogen and carbon production was developed by Spilrain et al. in Int. J. Hydrogen Energy, 24, 613, 1999. In this process the thermal decomposition of natural gas was performed in the presence of a carrier gas ($N_2$ or $H_2$) which was preheated to a temperature of 1627° C. to 1727° C. in the matrix of a regenerative gas heater.

A problem with these above-described processes is the very high temperature required for the methane cracking. There have therefore been numerous attempts to lower the temperature required for thermal decomposition of methane through the use of catalysts. Transition metals in particular have proven very active as catalysts for the methane decomposition reaction. However, one problem is catalyst deactivation due to carbon deposits on the catalyst surface.

This problem was in most cases solved by burning surface carbon deposits with air to regenerate the original catalytic activity. However, this has the disadvantage that all of the carbon is converted into $CO_2$ and hydrogen is obtained as the only usable reaction product. For example, Callahan in Proc. 26th Power Sources Symp. Red Bank, MJ 181, 1974 describes a catalytic reactor (fuel conditioner) configured to catalytically convert methane and other hydrocarbons into hydrogen for fuel cell applications. A stream of gaseous fuel is introduced into one of two reactor beds where the hydrocarbon decomposition into hydrogen is carried out at a temperature of 870-980° C. and the carbon is deposited on a nickel catalyst. Simultaneously, air is introduced into the second reactor where the catalyst is regenerated by burning the deposited carbon on the catalyst surface. The flow of fuel and air was reversed for another cycle of decomposition/regeneration. The process described does not require any water-gas shift or gas separation stages, which is a significant advantage. However, due to the cyclic nature of the process, hydrogen becomes contaminated with carbon oxides. The process also has the disadvantage that no carbon by-product is formed in the process.

U.S. Pat. No. 3,284,161 describes a process for continuous production of hydrogen by catalytic decomposition of gaseous hydrocarbon streams. The methane decomposition was carried out in a catalytic fluidized bed reactor in the temperature range from 815° C. to 1093° C. Nickel, iron and cobalt catalysts (preferably $Ni/Al_2O_3$) were used in this process. The catalyst contaminated with carbon was continuously removed from the reactor and introduced into a regeneration region where the carbon was burned off. The regenerated catalyst was then recycled into the reactor.

U.S. Pat. No. 5,650,132 describes a process for producing hydrogen from methane and other hydrocarbons by contacting with fine particles of a carbon-based material which is produced by arc discharge between carbon electrodes and has an external surface area of at least 1 $m^2/g$. The carbon-based material additionally comprised carbon black, obtained from the thermal decomposition of different organic compounds or the combustion of fuels, carbon nanotubes, activated carbon, fullerenes C60 or C70 and finely divided diamond. The optimal conditions for methane conversion comprise: methane dilution with an inert gas (preferably to a methane concentration of 0.8% to 5% by volume), a temperature range of 400° C. to 1200° C. and residence times of about 50 seconds. Increasing the methane concentration in the starting material from 1.8% to 8% by volume (at 950° C.) resulted in a drastic reduction in methane conversion from 64.6% to only 9.7%. It is also mentioned that the catalytic activity of the carbon catalysts gradually decreases during the hydrocarbon pyrolysis. It was proposed to supply oxidizing gases, such as $H_2O$ or $CO_2$, to the pyrolysis zone in order to increase the catalyst service life. However, this would have the disadvantage that the hydrogen is contaminated with carbon oxides, thus necessitating an additional cleaning step. It was also proposed to burn spent catalyst but this would be very disadvantageous due to the high cost of the carbon materials used in this process.

US 2007/111051 describes a process for $CO_2$-free production of hydrogen and carbon through thermocatalytic decomposition of hydrocarbon fuels over carbon-based catalysts in the absence of air and water. The catalyst employed in this case is for example "Darco®-KB-B" activated carbon, which has a surface area of 1500 $m^2/g$, a total pore volume of 1.8 ml/g and a particle size of 15 µm. In the context of this process the actual decomposition of the hydrocarbon feedstock is carried out at temperatures in the range from about 850° C. to 1000° C.

As is already apparent from the foregoing, in conventional reactors for pyrolytic decomposition of methane gas into carbon and hydrogen the resulting carbon in particular represents a substantial problem. To solve this problem, a project of TU Dortmund, Department of Biological and Chemical Engineering, Chair for Chemical Process Engineering under the direction of Prof. D. W. Agar (available at dechema.de/dechema_media/2942_Schlussbericht-p-4820.pdf) proposed a process in which methane is passed from top to bottom in a reactor space that was heated to temperatures of around 1100° C. This reaction mode allows carbon black particles formed to fall downwards in the course of the process and be discharged there with other gas components, such as the hydrogen gas and unconverted residual methane gas. To prevent the carbon from settling on the edge of the reactor vessel the actual reactor space is formed by a cylindrical porous ceramic matrix, through which an inert gas, for example in the form of nitrogen ($N_2$) gas, is introduced into the reactor space.

As part of the process developed by the Fraunhofer Institute for Ceramic Technologies, a reactor is completely surrounded by a heating medium in order to provide the energy required for the process mode. However, such a construction is difficult to implement, particularly in the case of larger reactors, and requires significant amounts of energy. It is easier to realize heating of the reactor space through electrical resistance elements that are installed in the reactor space itself. This may be achieved by arranging in the reactor one or more electrode pairs which effect resistance-heating of the reaction gases, for example by arranging a conductive material such as carbon particles between the electrodes. However, such a reactor configuration has the problem that the reactor inner wall in the reaction zone has temperatures above the pyrolysis temperature of methane/lower hydrocarbons. This has the result that these compounds also pyrolyze on the reactor wall, thus forming a pyrolytic carbon layer on the inner wall of the reactor.

The conductivity properties of the carbon layer can lead to an increasing current flow from one electrode to the other electrode via the pyrolytic carbon layer on the wall, which in extreme cases can lead to loss of heating if, as a result, no more current flows through the carbon bed.

Thus a need exists for a process mode of appropriately configured reactors that prevents the formation of a carbon conductivity bridge on the reactor wall.

DETAILED DESCRIPTION

Figure 1:
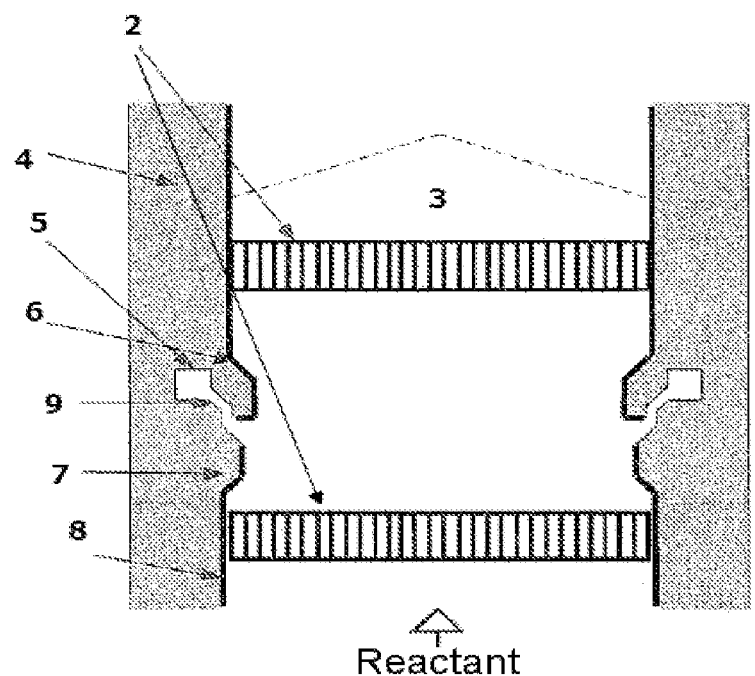
FIG. 1 is a schematic view of an example reactor.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention is in the field of pyrolytic decomposition of hydrocarbons and in particular of methane into hydrogen and pyrolytic carbon and relates in particular to a novel process for a corresponding conversion, wherein the reactor comprises two electrodes spaced apart from one another in the flow direction of the hydrocarbons and wherein in the region of the reactor between the electrodes an inert gas component is supplied over the entire reactor cross section. The invention further relates to an apparatus for performing a corresponding process.

The invention accordingly provides a process for producing hydrogen and pyrolytic carbon from hydrocarbons, wherein the hydrocarbons are converted into hydrogen and carbon in a reactor at temperatures of 1000° C. or more and wherein the reactor comprises two electrodes spaced apart from one another in the flow direction of the hydrocarbons, characterized in that in the region of the reactor between the electrodes an inert gas component is supplied over the entire reactor cross section and in that the reactor contains carbon particles in the region between the electrodes. In other words in the context of the process according to the invention an inert gas component, for example nitrogen, is supplied over the entire reactor cross section.

In the context of the present invention "inert gas component" denotes a gas or mixture of gases that is chemically inert with respect to the hydrocarbons in the reactor and does not react with them. This does not preclude that the inert gas component contains or consists of constituents inert with respect to the products generated in the reaction, in particular with respect to the carbon generated. Thus for example, hydrogen is a gas which, together with carbon and under suitable conditions, can form methane which may be utilized in the context of the invention to decompose carbon deposits on the walls of the reactor.

The indication that the inert gas component is passed into the reactor "over the entire reactor cross section" is not to be understood as meaning that an inert gas component is to be introduced in the entire region between the two electrodes. The inert gas component is preferably introduced between the electrodes only in a subregion of the reactor wall. This may be achieved for example via one or more feeding apparatuses.

The inert gas component is preferably introduced into the reactor space via one or more feeding apparatuses arranged on the reactor wall orthogonally to the flow direction of the hydrocarbons introduced into the reactor.

The carbon particles may be stationary in the region of the reactor between the two electrodes but it is also possible for the carbon particles to be in motion in this region.

In the context of the present invention it is preferable when the carbon particles are passed through the reactor counter to the flow direction of the hydrocarbons since this makes it possible to very largely inhibit the formation of conductivity bridges (through adhesion of carbon formed in the reaction) and thus a nonuniform temperature profile in the reactor.

The hydrocarbons to be included in the process according to the invention are not subject to any relevant limitations provided the liberation of hydrogen and the formation of carbon in the temperature range above 1000° C. are possible. Suitable hydrocarbons include, for example, hydrocarbons gaseous or liquid at standard temperature and standard pressure such as methane, propane, gasoline, diesel, residual oil or crude oil.

Preferred hydrocarbons in the context of the present invention are gaseous hydrocarbons such as methane and propane, of which methane is particularly preferred. The conversion of these hydrocarbons is carried out according to the reaction equations $$CH_4 \rightarrow C + 2H_2 \text{ and}$$

$$C_nH_m \rightarrow nC + m/2 H_2,$$

where n is more than 1 and m is not more than (2n+2). Both reactions are endothermic.

In the context of the process according to the invention the inert gas component is preferably an inert gas, such as nitrogen or argon, or a gas inert towards the hydrocarbons, such as the hydrogen gas produced in the reaction. The "inert gas" should consist substantially, i.e. preferably to 80% by volume, more preferably to at least 90% by volume and yet more preferably to at least 95% by volume, of an inert gas; small proportions of non-inert gases, for example methane, can be tolerated given an appropriate process mode. However, in these cases the temperature of the introduced inert gas should be selected such that it is below the decomposition temperature of methane gas to prevent carbon black formation in the feed conduit for the inert gas component. Both the inert gas component and the hydrocarbons should be free of oxidizing or oxidized constituents.

The carbon particles employed may advantageously be those which promote pyrolytic decomposition of the hydrocarbons and are electrically conductive in the range above 1000° C.

Particularly suitable carbon particles in the context of the invention are inter alia the products commercially available as DARCO® KB-B (from Norit Americas Inc.), Black Pearls 2000 (from CABOT Corp.) or XC-72 (from CABOT Corp.). However, in principle any material composed of carbon may be used, such as calcined petroleum coke, coking coal or the pyrolytic carbon generated in the process.

In the context of the invention it is generally sufficient if the process is operated with carbon particles separately produced for this purpose in the startup phase. Subsequently, a portion of the pyrolytic carbon generated in the context of the process may be used as the carbon particles either alone or in admixture with the separately produced carbon particles. For cost reasons preference is given to predominant use of pyrolytic carbon, and particular preference to exclusive use of pyrolytic carbon from the process, after the startup phase, i.e. once the reactor has produced sufficient pyrolytic carbon to operate the process therewith. The term "predominantly" here denotes a proportion of at least 60% by weight, preferably at least 70% by weight, more preferably at least 80% by weight and yet more preferably at least 90% by weight based on the total amount of carbon particles.

For the process according to the invention it is also advantageous when the reaction zone is arranged vertically in the reactor space and the hydrocarbons pass through the reaction zone from bottom to top and the carbon particles pass through the reaction zone from top to bottom. This process mode on the one hand ensures that temperature transfer between the hydrocarbons supplied to the reactor space and the carbon particles is made possible. On the other hand carbon generated from the hydrocarbons is largely deposited on the carbon particles and, in the case of non-static carbon particles, transported downwards out of the reaction space with the carbon particles while the product gas generated in the reactor space is discharged from the top of the reactor. This ensures that the resulting product gas is substantially free from carbon formed in the reactor space.

Additionally or alternatively the process according to the invention is particularly advantageous when the temperature in the reaction zone of the reactor is maintained in the range from 1000° C. to 1900° C., preferably in the range from 1200° C. to 1500° C.

As already indicated hereinabove it is advantageous when the inert gas component has a temperature lower than the temperature required for decomposition of hydrocarbons into carbon and hydrogen. A corresponding process mode can ensure that in the region where the inert gas component is supplied to the reactor space the reactor wall in this region is colder than in the rest of the reactor, thus inhibiting carbon black formation in the vicinity of the feed conduit for the inert gas component. A cooler inert gas additionally ensures that no carbon that could block the conduits is formed in the feed conduits for the inert gas to the reactor. In a preferred embodiment the supplied inert gas component has a temperature of less than 1000° C., preferably less than 900° C. and particularly preferably in the range from 200° C. to 800° C.

As likewise already mentioned hereinabove hydrogen is an inert gas with respect to the pyrolysis reaction of methane to afford hydrogen and carbon for example and may be used as an inert gas component in the context of the present invention. In a preferred embodiment, the process according to the invention is therefore configured such that a portion of the product gas generated in the context of the process, preferably 5% to 30% by volume and in particular 10% to 25% by volume, is supplied to the reactor as an inert gas component.

The hydrocarbons, especially in the form of methane, should advantageously be fed into the reactor at a flow rate which ensures extensive (i.e. at least 20%) to substantially complete (i.e. at least 70%) conversion of the hydrocarbons into hydrogen and carbon. Suitable flow rates are in this case a flow rate in the range from 0.001 m/s to 10 m/s, preferably 0.01 m/s to 1 m/s.

The process according to the invention is moreover particularly advantageously configured when the inert gas component is fed into the reactor at a flow rate in the range from 0.001 m/s to 100 m/s, preferably 0.1 m/s to 10 m/s.

A particularly advantageous process mode is established for the carbon particles employed in the context of the process according to the invention when these are fed into the reactor at a flow rate in the range from 0.5 m/h to 100 m/h and preferably 1 m/h to 10 m/h.

Another aspect of the present invention relates to an apparatus for pyrolytic conversion of hydrocarbons into hydrogen and carbon comprising a reactor 1 having a reactor space which comprises two electrodes 2 spaced apart from one another in the flow direction of the hydrocarbons, by means of which the reactor may be resistance-heated, and a feeding apparatus for an inert gas installed in the region between the electrodes of the reactor which extends over the entire reactor cross section. This apparatus is advantageously provided with feed conduits for starting product (for example methane) and carbon particles as catalyst and comprises discharge conduits for carbon particles and product gas.

The feeding apparatus is preferably installed orthogonally to the intended flow direction of hydrocarbons and carbon particles in the reactor. The feeding apparatus comprises a distributor for inert gas component which is in fluid connection (i.e. for example via an uninterrupted slot which intersects the reactor space, thus forming an entry opening) with the reactor space. The reactor cross section in the apparatus described hereinabove is advantageously round, in particular circular or oval. The reactor may also comprise a plurality of feeding apparatuses for inert gas component.

The apparatus may further be advantageously configured in such a way that the feeding apparatus is configured such that the reaction cross section narrows above and/or below the entry opening for the inert gas component into the reactor. It is particularly preferable when the reactor cross section narrows above and below the gas entry opening. The narrowing above the entry opening 6 ensures unshielded abrasion of the incipient pyrolytic layer and reduces the probability density of carbon particles in the entry region for the inert gas. The cross-sectional narrowing below the entry opening 7 reduces the dynamic pressure of the reactant gas/hydrocarbon gas flow on the entry opening.

On the other hand it may be advantageous for reasons of constructional complexity for the feeding apparatus to be configured such that the reactor cross section is uniform in the region between the electrodes with the exception of the entry opening for the inert gas component from the feeding apparatus, i.e. that there is no narrowing or widening of the reactor cross section in the region between the electrodes with the exception of this entry opening. The recessed position of the entry opening of the feeding apparatus relative to the reactor wall has the result that the gas velocity is slightly reduced in this region.

When the radially introduced inert gas has a sufficiently low temperature the radial temperature profile is shifted to low wall temperatures, thus in turn resulting in reduced pyrolysis in this region. To ensure uniform distribution of the gas phase volume flow over the reactor cross section, the height H1 of a slot through which the inert gas component is supplied to the reactor/the pressure drop $\Delta p$ between the gas pressure P1 in the distributor of the feed conduit and the gas pressure P2 in the reactor is advantageously to be established in a range which ensures distribution of the gas component over the entire cross section (i.e. the pressure in the region P1 is greater than the pressure in the reactor P2 by $\Delta p$). $\Delta p$ depends on the geometry and the conditions in the reactor.

It is also advantageous when the geometry of the distributor of the inert gas in the feeding apparatus is configured such that no carbon particles can enter the distributor geometry and a pyrolytic carbon bridge can form thereabove due to a longer residence time. To this end it is also preferable when the inert gas is introduced into the reactor at an angle of 30° to 60°, preferably about 45°, relative to the flow direction of the hydrocarbons.

Under advantageous conditions the product gas formed in the context of the process consists to a substantial extent of hydrogen with only small proportions of methane. The product gas is therefore suitable for partial recycling of the product gas stream into the reactor space as an inert gas.

For the apparatus according to the invention it is therefore preferable that said apparatus comprises a discharge conduit for product gas 13 formed in the reactor and that the discharge conduit comprises a diversion conduit 14, by means of which a portion of the product gas is returned to the reactor via the feeding apparatus for inert gas. Since as is indicated hereinabove the pressure for supplying the inert gas to the reactor space in the region of the feed conduit must be higher than in the reactor space itself, it is advantageous when the apparatus comprises in the region of the diversion conduit 14 a compressor 15 with which the inert gas is compressed to a higher pressure.

The use of product gas ($H_2$) as inert gas has the additional advantage that the product gas stream in the region of the feed conduit has a temperature which is markedly below the pyrolysis temperature of methane. At the pressures in the reactor space (typically in the range from 10 to 15 bar) the equilibrium of the reaction $CH_4 \rightarrow H_2 + C_{solid}$ is therefore on the side of methane. In the region of the distributor cross section the equilibrium is likewise on the side of methane on account of the lower temperature of the gas stream and the radially introduced $H_2$-containing gas stream therefore results in methanization of carbon present/chemical carbon removal. Due to the temperature increase in the region above the entry point of the inert gas the methane formed is re-pyrolyzed to afford hydrogen and carbon and this process mode therefore allows continuous cleaning of the feeding regions for the inert gas in the context of the process.

BRIEF DESCRIPTION OF THE DRAWINGS

FIG. 1 shows a reactor 1 configured according to the invention comprising two electrodes 2 spaced apart from one another and a carbon bed 3 extending beyond both electrodes. In FIG. 1 the reactor wall 4 comprises a distributor structure for inert gas 5, from which inert gas is passed into the reactor via a slot 9. Below and above the distributor structure 5 the reactor cross section narrows 6, 7. As a result an elevated gas velocity is realized in these narrowed regions, thus reducing the probability density of carbon particles in this region. In the area below the distributor structure for inert gas 7 the narrowing also acts as a deflection means for gas flowing through. A pyrolytic carbon layer 8 is formed on the reactor inner wall in the course of the process.

Figure 2:
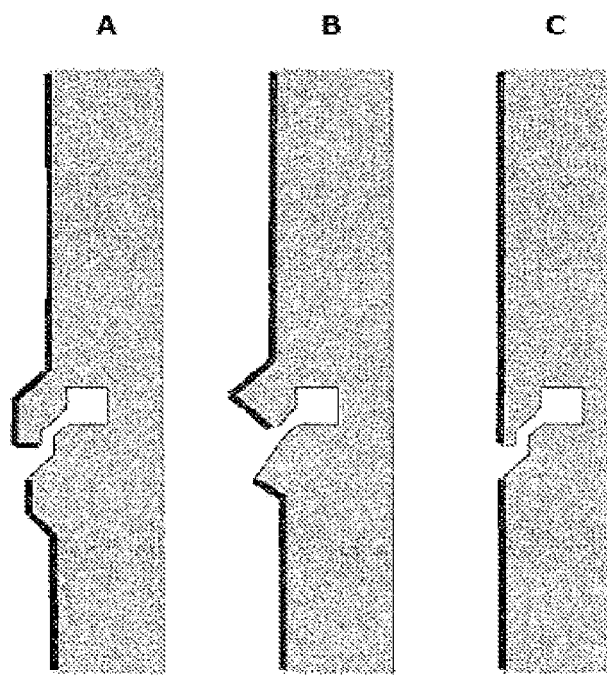
FIG. 2 is a schematic view of various example feed conduits.

FIG. 2 shows different variants of the feed conduit for inert gas into the reactor space, wherein the variants A and B are configured with narrowings of the reactor cross section in the region above and below the feed conduit for the inert gas while variant C features a feed conduit configured such that the reactor cross section is uniform in the region between the electrodes with the exception of the outlet for inert gas from the feeding apparatus.

Figure 3:
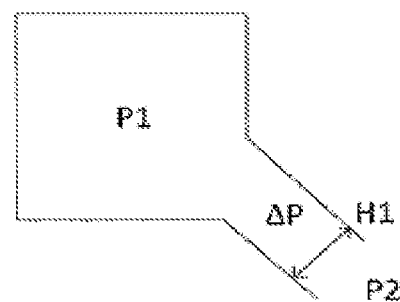
FIG. 3 is a schematic view of an example gas distributor construction.

FIG. 3 shows a gas distributor construction according to the invention, wherein H1 indicates the slot height through which the gas flows from the distributor space into the reactor space. P1 denotes the distributor pressure, P2 the reactor pressure and Δp the pressure drop between the distributor pressure and the reactor pressure.

Figure 4:
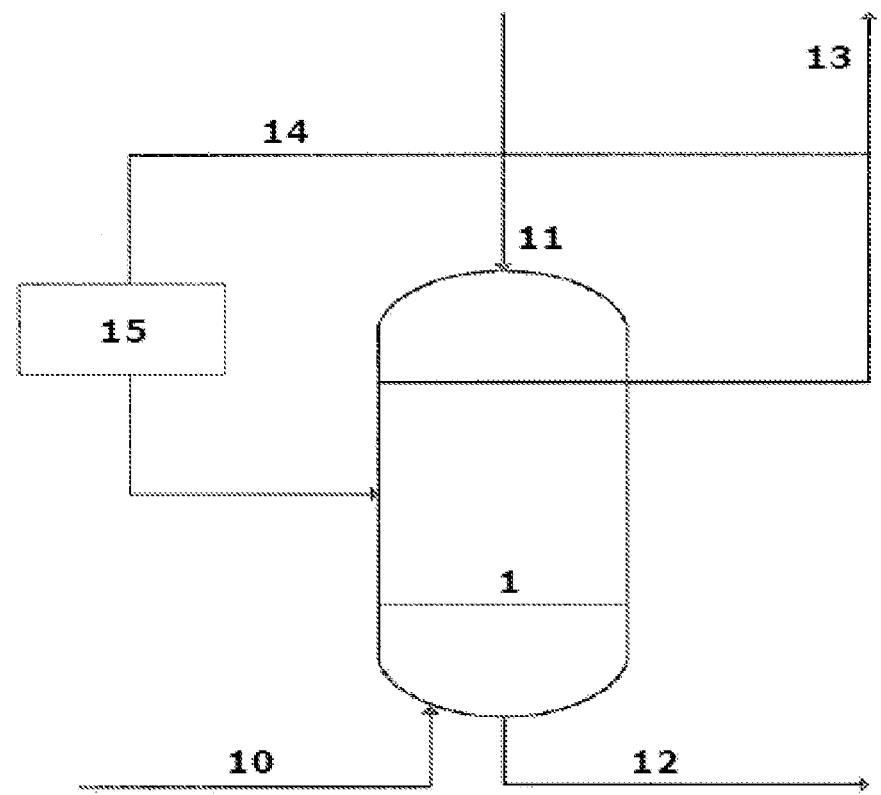
FIG. 4 is a schematic view of an example apparatus that includes a reactor, a feed conduit for hydrocarbon starting material, a feed conduit for carbon particles, a discharge conduit for carbon particles, and a discharge conduit for product gas.

FIG. 4 shows a scheme of an apparatus according to the invention comprising a reactor 1, a feed conduit for hydrocarbon starting material 10, a feed conduit for carbon particles 11, a discharge conduit for carbon particles 12 and a discharge conduit for product gas 13. Provided in the region of the discharge conduit for product gas is a diversion 14, by means of which a portion of the product gas may be passed into a compressor 15 and from there passed back into the reactor.

LIST OF REFERENCE NUMERALS

1 Reactor
2 Electrodes
3 Carbon bed
4 Reactor wall
5 Distributor structure for inert gas
6 Upper narrowing of reactor cross section
7 Lower narrowing of reactor cross section
8 Pyrolytic carbon layer
9 Feed slot for inert gas
10 Feed conduit for hydrocarbon starting material
11 Feed conduit for carbon particles
12 Discharge conduit for carbon particles
13 Discharge conduit for product gas
14 Diversion
15 Compressor

What is claimed is:

1. A process for producing hydrogen and pyrolytic carbon from hydrocarbons, the process comprising:
converting the hydrocarbons into hydrogen and carbon in a reactor at a temperature of 1000° C. or more, wherein the reactor includes two electrodes spaced directly apart from one another in a flow direction of the hydrocarbons in a region between the two electrodes, such that the two electrodes are directly aligned with one another in the flow direction, wherein the two electrodes are electrically coupled to one another by a carbon bed; and
supplying, from an uninterrupted slot extending around an entire reactor cross section, in the region between the two electrodes, an inert gas component.

2. The process of claim 1 wherein the hydrocarbons are methane.

3. The process of claim 1 wherein the inert gas component is nitrogen or hydrogen.

4. The process of claim 1 wherein the reactor comprises a reaction zone that is arranged vertically in a reactor space, wherein the hydrocarbons pass through the reaction zone from bottom to top and the carbon bed passes through the reaction zone from top to bottom.

5. The process of claim 1 wherein the inert gas component has a temperature of less than 1000° C.

6. The process of claim 1 comprising supplying as the inert gas component a portion of a product gas that is generated by the process.

7. The process of claim 1 comprising introducing the inert gas component into the reactor at an angle of between 30° to 60° relative to the flow direction of the hydrocarbons.

8. The process of claim 1 comprising maintaining a temperature in a reaction zone of the reactor in a range from 1000° C. to 1800° C.

9. The process of claim 1 comprising feeding the hydrocarbons into the reactor at a flow rate in a range from 0.001 m/s to 10 m/s.

10. The process of claim 1 comprising feeding the inert gas into the reactor at a flow rate in a range from 0.001 m/s to 100 m/s.

11. The process of claim 1 comprising passing the carbon bed particles through the reactor counter to the flow direction of the hydrocarbons.

12. The process of claim 11 wherein the carbon bed is fed into the reactor at a flow rate in a range from 0.5 m/h to 100 m/h.

13. An apparatus for pyrolytic conversion of hydrocarbons into hydrogen and carbon, the apparatus comprising:
a reactor having a reactor space that comprises two electrodes that are spaced directly apart from one another in a flow direction of the hydrocarbons, such that the two electrodes are directly aligned with one another in the flow direction, wherein the two electrodes are electrically coupled to one another by a carbon bed, by means of which the reactor may be resistance-heated; and
a feeding apparatus for an inert gas, including an uninterrupted slot extending around an entire reactor cross section, installed in a region between the two electrodes.

14. The apparatus of claim 13 wherein the feeding apparatus is configured such that the reactor cross section narrows above and/or below a gas entry opening.

15. The apparatus of claim 13 wherein the feeding apparatus is configured such that the reactor cross section is uniform in the region between the two electrodes except at an outlet for the inert gas from the feeding apparatus.

16. The apparatus of claim 13 wherein the feeding apparatus is configured to supply the inert gas to the reactor via the slot and the slot has a height, wherein the height of the slot is configured to cause a pressure drop that ensures distribution of the inert gas over the entire reactor cross section while the inert gas is flowing.

17. The apparatus of claim 13 wherein the feeding apparatus is configured such that the inert gas is introducible into the reactor at an angle of 30° to 60° relative to the flow direction of the hydrocarbons.

18. The apparatus of claim 13 comprising a discharge conduit for product gas formed in the reactor, wherein the discharge conduit comprises a diversion conduit by way of which a portion of the product gas is returnable to the reactor via the feeding apparatus for the inert gas.

19. The apparatus of claim 18 comprising a compressor in a region of the diversion conduit.

* * * * *